United States Patent
Moulin

(10) Patent No.: US 8,616,876 B2
(45) Date of Patent: Dec. 31, 2013

(54) KIT FOR A MACHINE FOR INJECTION-MOULDING MOULDED PARTS

(75) Inventor: Jacky Moulin, Sainte Marie Laumont (FR)

(73) Assignee: Moulindustrie, Sainte Marie Laumont (FR)

( * ) Notice: Subject to any disclaimer, the term of this patent is extended or adjusted under 35 U.S.C. 154(b) by 29 days.

(21) Appl. No.: 13/318,507

(22) PCT Filed: May 11, 2010

(86) PCT No.: PCT/EP2010/056427
§ 371 (c)(1),
(2), (4) Date: Feb. 1, 2012

(87) PCT Pub. No.: WO2010/130719
PCT Pub. Date: Nov. 18, 2010

(65) Prior Publication Data
US 2012/0128814 A1    May 24, 2012

(30) Foreign Application Priority Data

May 11, 2009  (FR) ...................................... 09 53082

(51) Int. Cl.
*B29C 45/20* (2006.01)
(52) U.S. Cl.
USPC ......... 425/574; 264/255; 264/297.3; 425/576
(58) Field of Classification Search
USPC ................ 425/574, 575, 576; 264/255, 297.3
See application file for complete search history.

(56) References Cited

U.S. PATENT DOCUMENTS

| 6,558,599 | B1 * | 5/2003 | Bethune | 264/255 |
| 7,608,212 | B2 * | 10/2009 | Gram | 264/254 |
| 8,029,264 | B2 * | 10/2011 | Choi et al. | 425/130 |
| 8,057,720 | B2 * | 11/2011 | Kim et al. | 264/255 |

FOREIGN PATENT DOCUMENTS

| DE | 20 2004 020287 | 8/2005 |
| FR | 2 841 174 | 12/2003 |
| JP | 10 175230 | 6/1998 |

OTHER PUBLICATIONS

Preliminary Examination Report on Patentability in English for PCT/EP2010/056427, dated Nov. 24, 2011.
International Search Report for PCT/EP2010/056427, mailed Jul. 28, 2010.
Foreign-language Written Opinion of the International Searching Authority for PCT/EP2010/056427, mailed Jul. 28, 2010.
Wurst, S., "Entnehmen Bei Gescholossenem Werkzeug", Plastverarbeiter, vol. 54, No. 6, (Jun. 1, 2003), pp. 26-27.

* cited by examiner

*Primary Examiner* — Tim Heitbrink
(74) *Attorney, Agent, or Firm* — Nixon & Vanderhye, PC

(57) ABSTRACT

The invention concerns a kit for a machine for the injection moulding of moulded parts, the moulding machine comprising a first platen and a second platen, the kit comprising: a first support plate intended to be fixed to the said first platen; a second support plate intended to be fixed to the said second platen, the two platens being designed to be able to move with respect to each other by sliding so as to adopt successively an open position and a closed position; for the first support plate, at least one barrel of a first type, mounted so as to able to move in rotation on the said first support plate about an axis perpendicular to the plane of the said first support plate, and carrying at least two cavities; for the second support plate, at least one barrel of a second type, mounted so as to be able to move in rotation on said second support plate about an axis perpendicular to the plane of the said second support plate, and carrying at least two cavities.

2 Claims, 8 Drawing Sheets

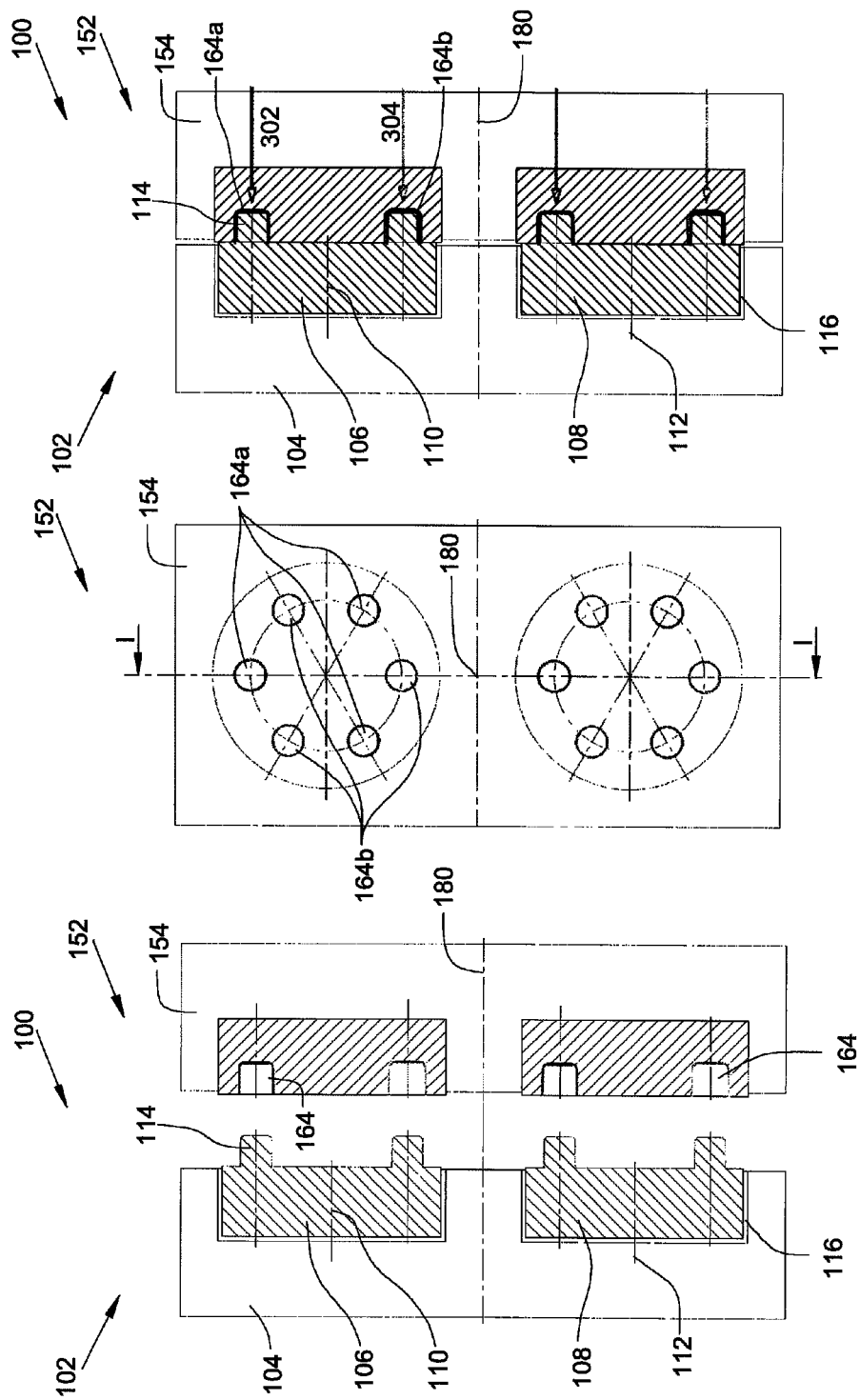

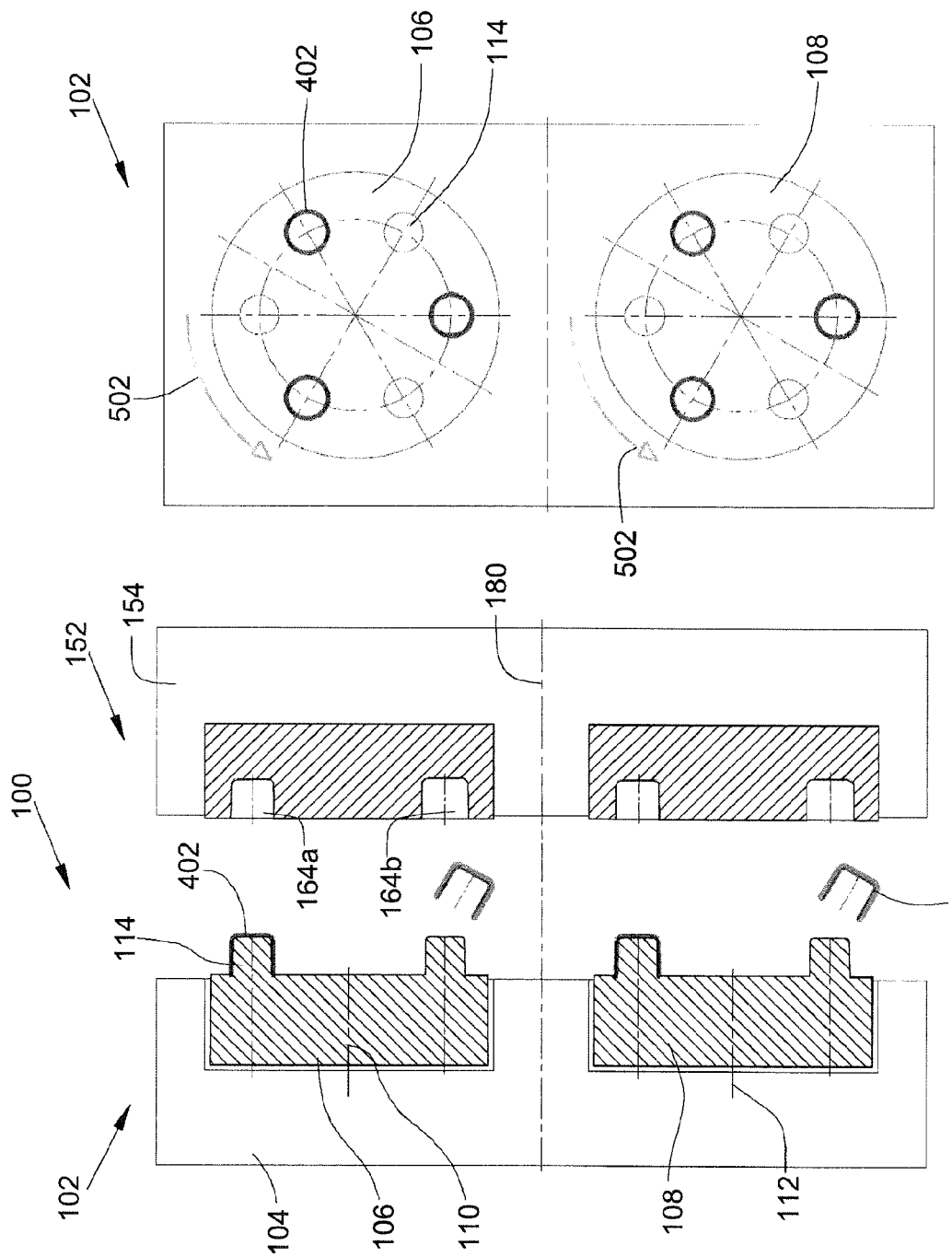

Figure 10B:
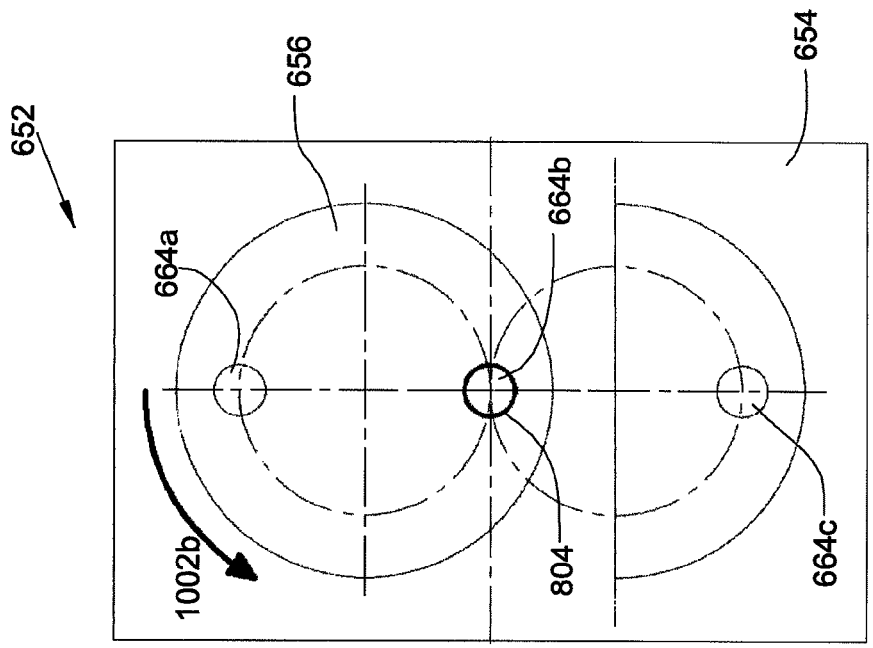

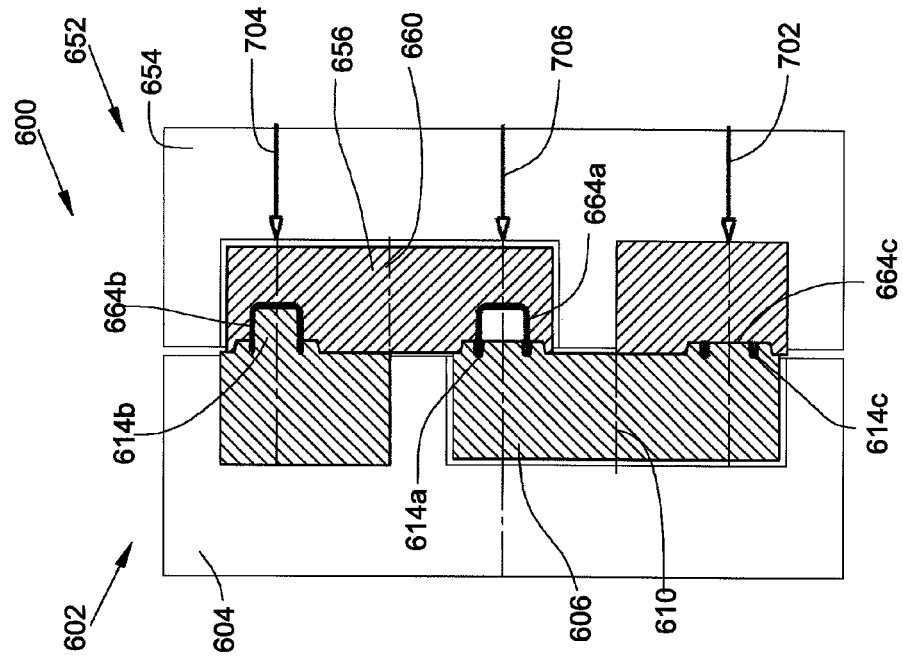
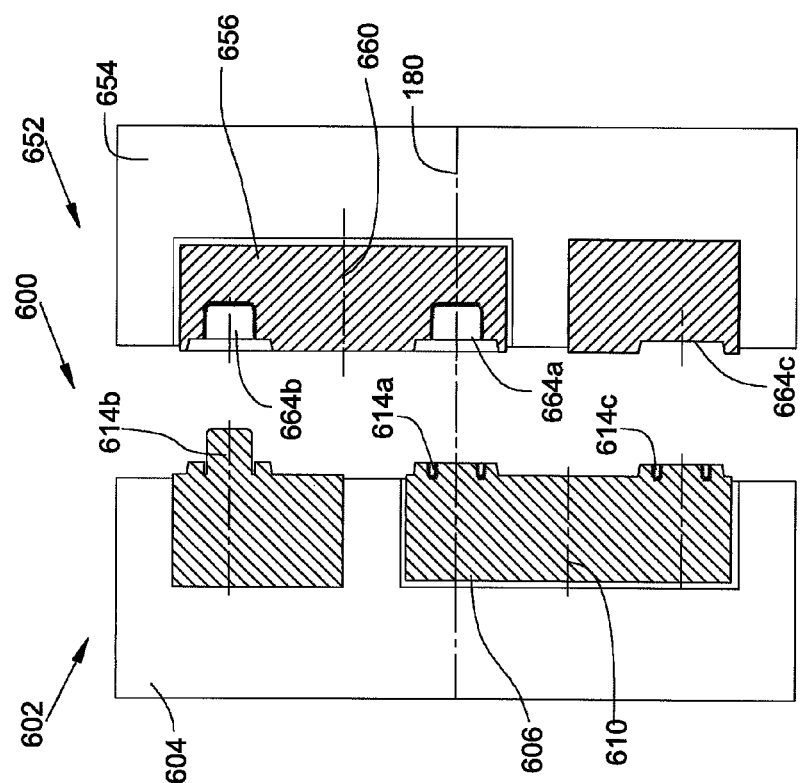
Fig. 7
Fig. 6

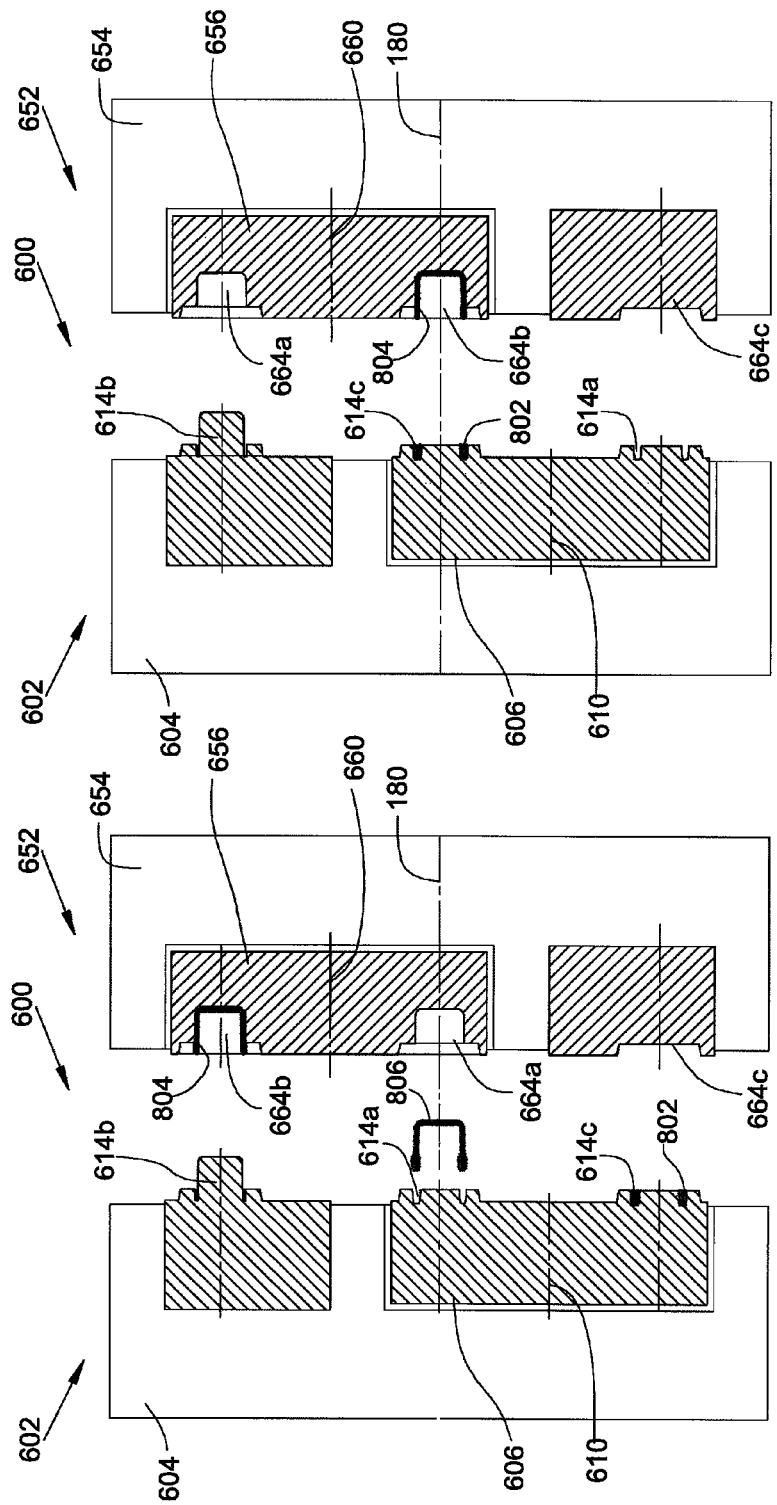

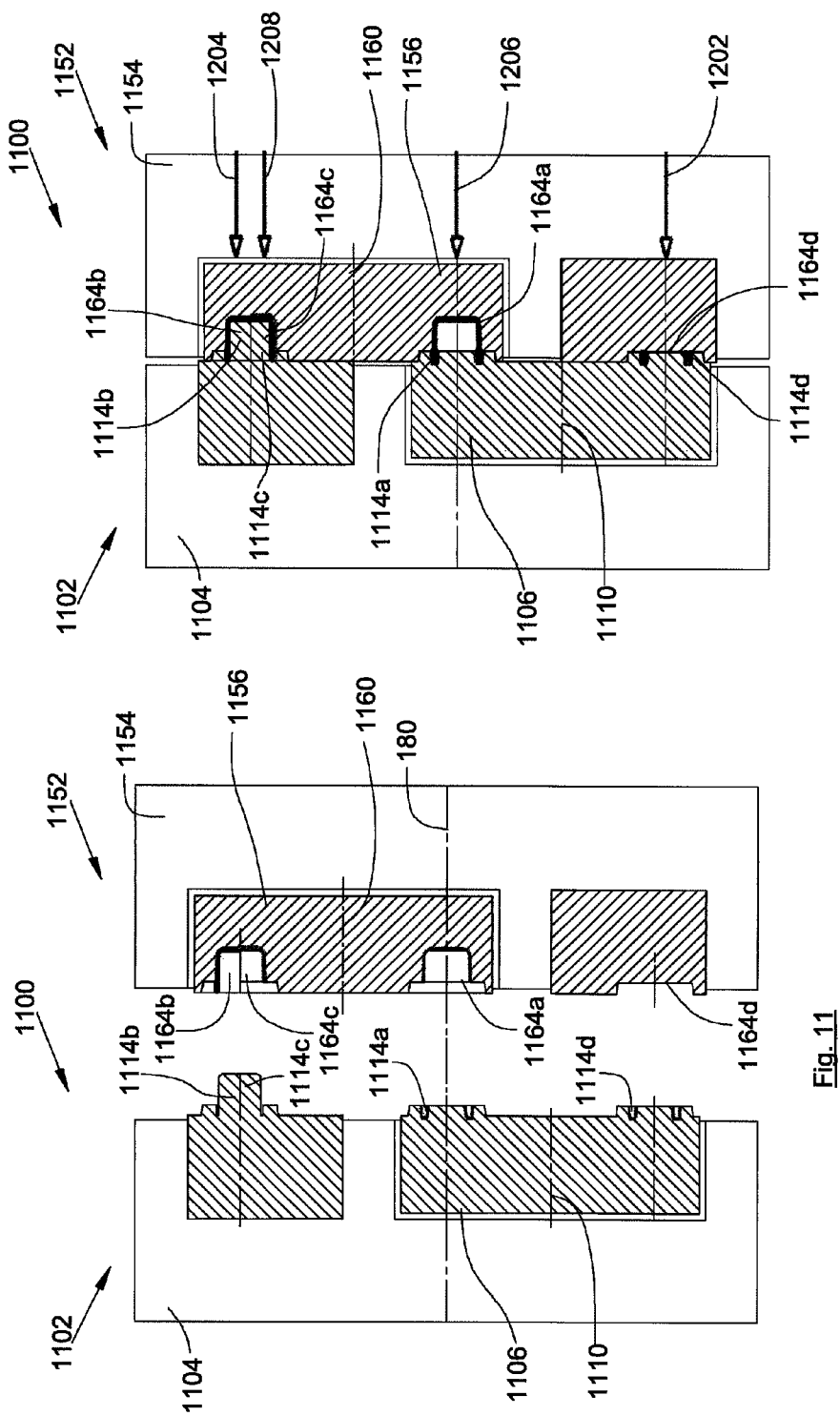

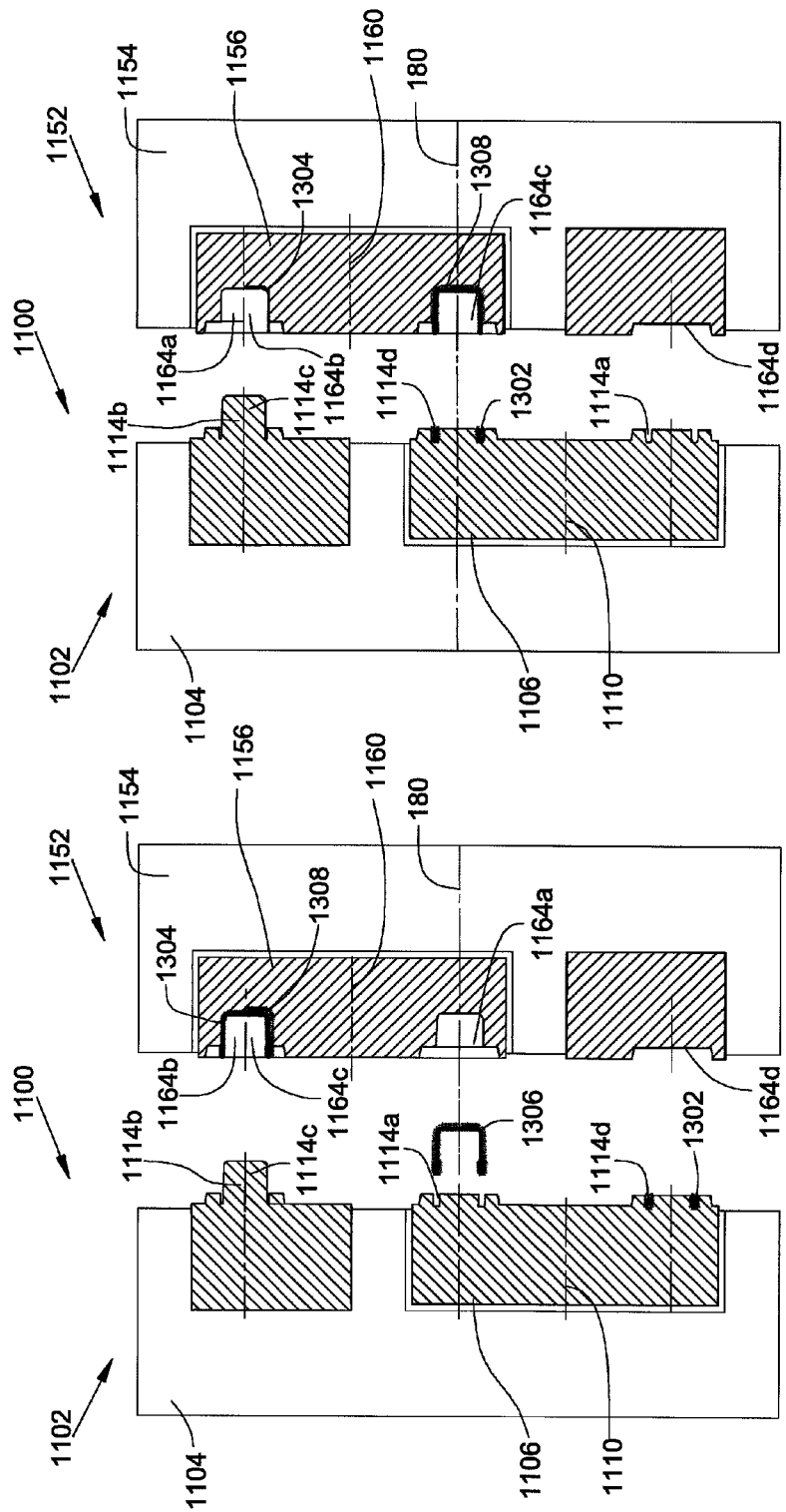

KIT FOR A MACHINE FOR INJECTION-MOULDING MOULDED PARTS

This application is the U.S. national phase of International Application No. PCT/EP2010/056427, filed 11 May 2010, which designated the U.S., and claims priority to FR Application No. 09/53082, filed 11 May 2009, the entire contents of which is hereby incorporated by reference.

The present invention concerns a kit for an injection moulding machine comprising at least one barrel, and an injection moulding machine comprising such a kit.

In order to mould a multitude of parts, for example of the receptacle stopper type, an injection moulding machine of the prior art comprises a first plate, one of the faces of which carries a plurality of first moulding forms and a second plate one of the faces of which carries a plurality of second moulding forms. Each first moulding form is associated with a second moulding form in order to form a space in which material is injected in order to produce the part to be moulded.

The two plates are able to move with respect to each other, sliding between a closed position and an open position in a translation direction substantially orthogonal to the plane of the two faces.

In the closed position, the two faces are in contact one against the other so that the first moulding forms and the corresponding second moulding forms are facing each other. Each of the spaces is then filled with the required moulding material.

In the open position, the two plates are distant from each other to enable the moulded parts to be ejected.

In the case of the prior art, when overmoulding of the moulded part is necessary, each part must be put in another apparatus, where it is overmoulded.

When a first moulded element must be assembled with a second moulded element in order to produce the final part to be moulded, another machine must be set up to recover the first and second elements and to assemble them.

Whether in the case of overmoulding or in the case of assembly, it is necessary to provide another machine to arrive at the final part. Such machines are expensive both to purchase and to maintain.

It is therefore desirable to find an injection moulding machine that makes it possible to perform these various operations and has a reduced cost price.

One object of the present of the invention is to propose a kit for an injection moulding machine that does not have the drawbacks of the prior art and in particular makes it possible to produce overmoulded and/or assembled parts simply and inexpensively.

For this purpose, a kit is proposed for a machine for the injection moulding of moulded parts, the moulding machine comprising a first platen and a second platen, the kit comprising:
- a first support plate intended to be fixed to the said first platen,
- a second support plate intended to be fixed to the said second platen, the two platens being designed to be able to move with respect to each other by sliding in a translation direction so as to adopt successively an open position in which the two support plates are distant from each other and a closed position in which the two support plates are up against each other,
- for the first support plate, at least one barrel of a first type, mounted so as to be able to move in rotation on the said first support plate about an axis perpendicular to the plane of the said first support plate, and carrying at least two cavities,
- for the second support plate, at least one barrel of a second type, mounted so as to be able to move in rotation on said second support plate about an axis perpendicular to the plane of the said second support plate, and carrying at least two cavities,
- for each of said cavities, a counter-cavity disposed on the other support plate,
- driving means intended to rotate each barrel to allow the successive positioning of each cavity opposite at least two different counter-cavities and so that, at each rotation movement of each barrel, one of the cavities of the said barrel of the first type is opposite one of the counter-cavities of the said barrel of the second type and so that, at each rotation movement of each barrel, the other cavity of the said barrel of the first type and the associated counter-cavity of the said second support plate constitute a moulding pair for a first element of the part to be moulded, one of the other cavities of the said barrel of the second type and the associated counter-cavity of the said first support plate constitute a moulding pair for a second element of the part to be moulded, one of the other cavities of the said barrel of the second type and the associated counter-cavity of the said first support plate constitute an overmoulding pair for the said second element, and the said pair consisting of the cavity of the said barrel of the first type and counter-cavity of the said barrel of the second type constitute an assembly pair for the said first element thus moulded and for the said second element thus moulded and overmoulded.

The invention also proposes a machine for the injection moulding of moulded parts, comprising:
- a first platen,
- a second platen, the two platens being designed to be able to move with respect to each other by sliding in a translation direction, and
- a kit according to the above variant.

Figure 10A:
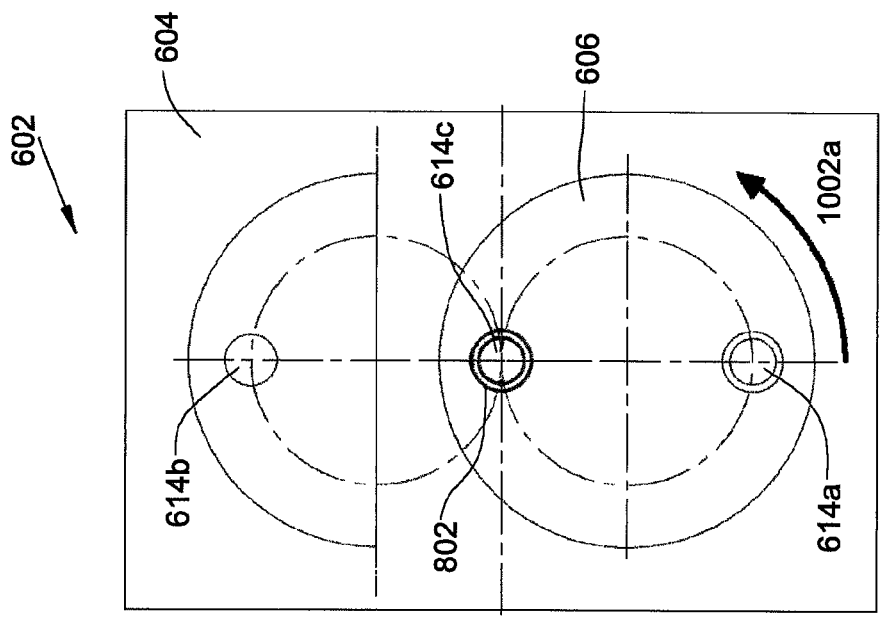
Figure 15B:
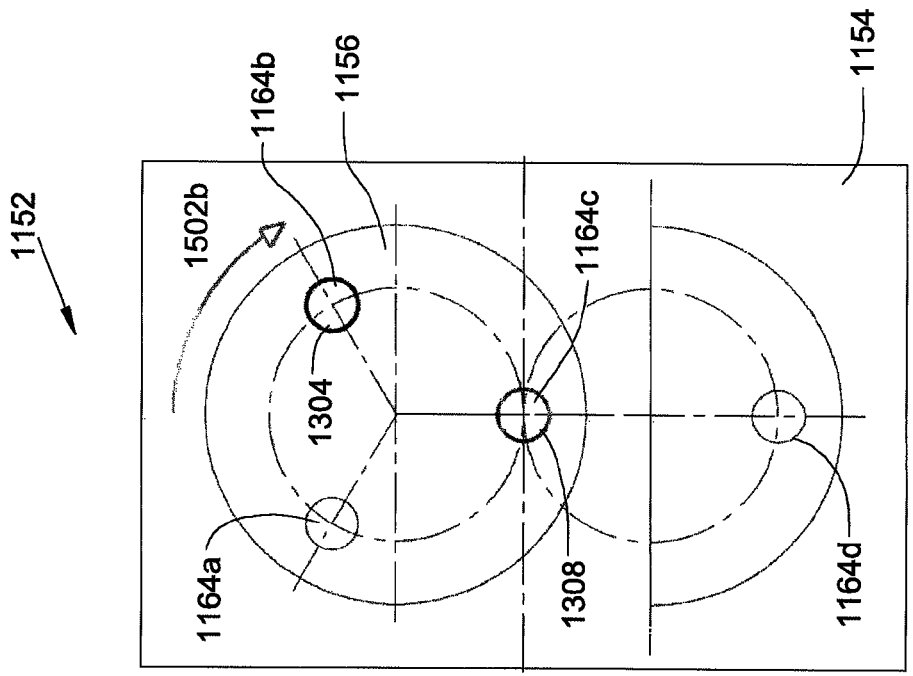
Figure 15A:
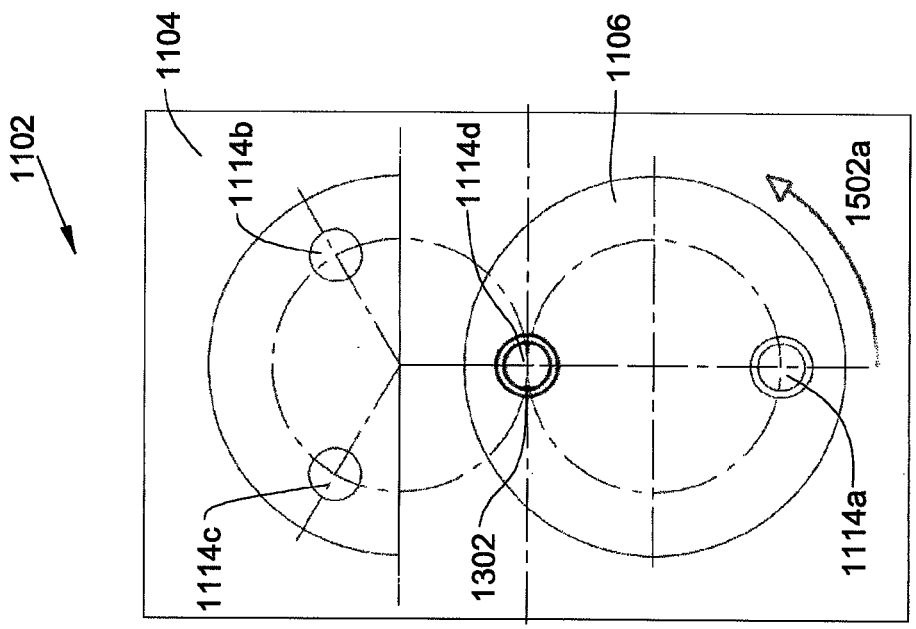

The features of the invention mentioned above, as well as others, will emerge more clearly from a reading of the following description of an example embodiment, the said description being given in relation to the accompanying drawings, among which:

FIG. 1 shows a view in section along the line I-I of FIG. 2, of a kit for an injection moulding machine according to a first embodiment of the invention in the open position, FIG. 2 is a front view of a plate of the kit of FIG. 1, FIG. 3 is a view similar to that in FIG. 1 in the closed position, FIG. 4 is a view similar to that in FIG. 1 during the ejection of moulded parts, FIG. 5 is a front view of a plate of the kit of FIG. 1 during the rotation of the barrels, FIG. 6 shows a side view of a kit for an injection moulding machine according to a second embodiment of the invention in the open position, FIGS. 7, 8 and 9 are views similar to FIG. 6 for different moulding steps, FIG. 10a is a front view of a plate of the kit of FIG. 7 during the rotation of the barrels, FIG. 10b is a front view of a plate of the kit of FIG. 6 during the rotation of the barrels, FIG. 11 shows a side view of a kit for an injection moulding machine according to a third embodiment of the invention in the open position, FIGS. 12, 13 and 14 are views similar to FIG. 11 for different moulding steps, FIG. 15a is a front view of a plate of the kit of FIG. 11 during the rotation of the barrels, and FIG. 15b is a front view of a plate of the kit of FIG. 11 during the rotation of the barrels.

In the assembly in the figures, the kits are mounted on injection moulding machines that are connected to an injection press, not shown, which supplies the spaces delimited by the cavities and counter-cavities with moulding materials.

In the following description, the term "cavity" represents a moulding form disposed on a barrel and the term "counter-cavity" represents the associated moulding form complementary to the said cavity. Thus a moulding form disposed on the barrel may be called "cavity" and "counter-cavity". A moulding form disposed directly on a support plate is called "counter-cavity".

The moulding machine comprises a first platen and a second platen that are designed to be able to move with respect to each other by sliding in a translation direction 180 so as to adopt successively an open position and a closed position.

FIG. 1 shows a kit 100 for an injection moulding machine intended to produce a part by moulding as well as to effect overmoulding on it before ejection thereof. The kit 100 comprises a first assembly 102 and a second assembly 152.

The first assembly 102 comprises a first support plate 104, the second assembly 152 comprises a second support plate 154.

The first support plate 104 is intended to be fixed to the first platen and the second support plate 154 is intended to be fixed to the second platen, so that, in the open position, the two support plates 104 and 154 are distant from each other and in the closed position the two support plates 104 and 154 are up against each other.

For at least one of the said support plates 104, 154, here the first support plate 104, at least one barrel 106, 108 is fitted (here two barrels are fitted).

Each barrel 106, 108 is firstly mounted so as to be able to move in rotation on the said support plates 104 about an axis 110, 112 parallel to the translation direction 180, and secondly carries at least two cavities 114. The translation direction 180 is perpendicular to the plane of each support plate 104, 154.

For each of the cavities 114, the second support plate 154 has a counter-cavity 164.

Driving means intended to rotate each barrel 106, 108 are provided. The driving means enable each cavity 114 to be positioned successively opposite at least two different counter-cavities 164. These driving means may be hydraulic, pneumatic or electrical.

As explained below, a moulding machine comprising such a kit 100 makes it possible to mould a part and to overmould the part thus moulded.

The first support plate 104 has, on one of the faces thereof, for each barrel 106, 108, a housing 116 intended to house the said barrel 106, 108.

Each barrel 106, 108 carries a plurality of cavities 114, each conformed so as to produce a portion of a part to be moulded and, in particular, the portion not receiving any overmoulding.

The second support plate 154 comprises, for each cavity 114, a counter-cavity 164. Each counter-cavity 164 is here conformed so as to produce another portion of the part to be moulded and, in particular, the portion receiving the overmoulding.

The movement of the platens and therefore the support plates 104 and 154 with respect to each other can be achieved for example by fitting actuators between the two platens.

The fact that the support plates 104 and 154 support only a translation movement rather than a rotation movement makes it possible to ensure correct positioning of the cavities 114 and counter-cavities 164.

FIG. 2 shows the second assembly 152 seen in front view.

For each barrel 106, 108, six counter-cavities 164a and 164b have been shown and are distributed angularly in a regular manner every 60°. In the same way, six cavities 114 are provided on each barrel 106, 108.

The counter-cavities 164a are the counter-cavities in which the part to be moulded is injected and the counter-cavities 164b are the counter-cavities in which the overmoulding of the part thus moulded is carried out.

FIG. 3 shows the kit 100 in the closed position.

Each pair consisting of a cavity 114 and counter-cavity 164a is supplied by an injection press with material intended to produce the part to be moulded. The arrow 302 represents this injection.

Each pair consisting of a cavity 114 and a counter-cavity 164b is supplied by the injection press with material intended to produce the overmoulding of the part to be moulded. The arrow 304 represents this injection.

FIG. 4 shows the kit 100 in the open position. This position follows the position shown in FIG. 3, where a part 402 has been moulded by a cavity 114/counter-cavity 164a pair and where a previously moulded part 404 has been overmoulded by a cavity 114/counter-cavity 164b pair.

In the open position, the part 404 is ejected while the part 402 remains in place on the corresponding barrel 106, 108, and here it remains on the cavity 114.

FIG. 5 shows the second assembly 102 seen in front view.

In the open position, each barrel 106, 108 is rotated by the driving means over an angle of 60°. The arrows 502 represent these rotations. According to the number of counter-cavities 164, the rotation angle may vary. The rotation angle is equal to 360° divided by the number of counter-cavities 164.

After this rotation 502, the kit 100 goes into the closed position (FIG. 3) but the cavities 114 have moved and each is now situated opposite another counter-cavity 164a, 164b. That is to say the cavities 114 which, before the rotation 502, were situated opposite a counter-cavity 164a, are, after the rotation 502, situated opposite a counter-cavity 164b, and vice versa.

The empty cavities 114 are situated opposite the counter-cavities 164a and the cavities 114 carrying the parts 402 are situated opposite the counter-cavities 164b.

Thus, at each rotation movement of each barrel 106, 108, at least one of the cavity 114/counter-cavity 164a pairs constitutes a moulding pair for the part to be moulded, and at least one of the other cavity 114/counter-cavity 164b pairs constitutes a pair for overmoulding the part thus moulded.

In the case of a simple overmoulding, there are an even number of counter-cavities 164, which are angularly distributed uniformly and interposed in two groups of counter-cavities 164a and 164b. The counter-cavities 164a of the first group serving for the moulding and the counter-cavities 164b of the second group serving for the overmoulding. The number of moulding pairs is equal to the number of overmoulding pairs.

In the case of multiple overmoulding, there is at least one counter-cavity 164a for effecting the moulding of the part 402 and for each overmoulding there is at least one counter-cavity 164b for carrying out the said overmoulding. For each overmoulding, the number of counter-cavities 164b is equal to the number of counter-cavities 164a.

Naturally it is possible to distribute the groups differently. For example, the counter-cavities 164a are grouped together on the same side of an axis of symmetry and the counter-cavities 164b are grouped together on the other side of the axis of symmetry. The angle of rotation of the barrels 106 and 108 is then different, for example 180°.

The method of moulding and overmoulding the part 404 implemented with the moulding machine comprising the kit 100 comprises, from the closed position of the two support plates 104 and 154:

- a step of overmoulding the previously moulded part 404 by an overmoulding pair consisting of a cavity 114 and a counter-cavity 164b,
- a step of moulding the part 402 by a moulding pair consisting of a cavity 114 and a counter-cavity 164a,
- a step of the two support plates 104 and 154 going into the open position,
- a step of ejecting the part 402 thus overmoulded,
- a step of rotating each barrel 106, 108 so as firstly to bring a cavity 114 from a position opposite a counter-cavity 164a to a position opposite a counter-cavity 164b and secondly to bring a cavity 114 from a position opposite a counter-cavity 164b to a position opposite a counter-cavity 164a,
- a step of the two support plates 104 and 154 going into the closed position, and
- a step of looping back onto the overmoulding step.

FIG. 6 shows a kit 600 for an injection moulding machine according to another embodiment of the invention. The injection moulding machine makes it possible to mould two elements and to assemble them in order to produce the final part to be moulded.

The kit 600 comprises a first assembly 602 and a second assembly 652.

The first assembly 602 comprises a first support plate 604 and the second assembly 652 comprises a second support plate 654.

The first support plate 604 is intended to be fixed to the first platen and the second support plate 654 is intended to be fixed to the second platen, so that, in the open position, the two support plates 604 and 654 are distant from each other and in the closed position the two support plates 604 and 654 are up against each other.

For the first plate 604, a barrel 606 of the first type is fitted and for the second plate 654 a barrel 656 of a second type is fitted.

Each barrel 606, 656 is firstly mounted so as to be able to move in rotation on the relevant support plate 604, 654 about an axis 610, 660 parallel to the translation direction 180, and secondly carries at least two cavities respectively referenced 614a and 614c, 664a-b. For each of the cavities 614a and 614c, a counter-cavity 664a, 664c is disposed on the second support plate 654, either on the barrel 656 of the second type or directly on the second support plate 654. For each of the cavities 664a and 664b, a counter-cavity 614a, 614b is disposed on the first support plate 604, either on the barrel 606 of the first type or directly on first support plate 604. The translation direction 180 is perpendicular to the plane of each support plate 604, 654.

In the embodiment in FIGS. 6 to 10b, the barrel 606 of the first type carries two cavities 614a and 614c and the barrel 656 of the second type carries two cavities 664a-b.

In order to assemble two previously moulded elements and, as explained below, at each rotation movement of each barrel 606, 656, one of the cavities 614a of the barrel 606 of the first type is opposite one of the counter-cavities 664a of the barrel 656 of the second type. This cavity 614a of the barrel 606 of the first type and its counter-cavity 664a of the barrel 656 of the second type constitute an assembly pair for the two moulded elements.

At each rotation movement of each barrel 606, 656, the other cavity 614c of the barrel 606 of the first type and the associated counter-cavity 664c of the second support plate 654 constitute a moulding pair for a first element of the part to be moulded, and the other cavity 664b of the barrel 656 of the second type and the associated counter-cavity 614b of the first support plate 604 constitute a moulding pair for a second element of the part to be moulded.

The counter-cavity 614b and the counter-cavity 664c are fixed to the support plates 604 and 654.

FIG. 7 shows the kit 600 in the closed position.

Each pair consisting of the counter-cavity 614b and the associated cavity 664b or the cavity 614c and the associated counter-cavity 664c, that is to say one of the moulding forms 614b, 664c of which is not on a barrel 606, 656, constitutes a moulding pair that is supplied by an injection press with material intended to produce the elements to be moulded. The arrow 702 represents this injection intended to mould the first element and the arrow 704 represents this injection intended to mould the second element.

The arrow 706 represents an assembly force that is generated for the assembly pair (614a, 664a) in order to effect the assembly of the first element and second element previously moulded in order to produce the definitive part.

This assembly force may be generated for example by a stud moved hydraulically, pneumatically or electrically, or by a pressurised air jet that pushes one of the two elements into the other.

FIG. 8 shows the kit 600 in the open position. This position follows the position shown in FIG. 7, where a first element 802 has been moulded by the moulding pair (614c, 664c) for the first element, and where a second element 804 has been moulded by the moulding pair (614b, 664b) of the second element.

In the open position, the assembled part 806 is ejected while the first element 802 and the second element 804 remain fixed to the corresponding barrel 606, 656.

FIG. 10a shows the first assembly 602 seen in front view, and FIG. 10b shows the second assembly 652 seen in front view.

In the open position, each barrel 606, 656 is rotated by driving means over an angle of 180°. The arrows 1002a and 1002b represent these rotations.

After these rotations 1002a and 1002b, the kit 600 goes into the closed position (FIG. 7) but the cavities 614a and 614c, and 664a-b have moved. Each cavity 614a, 614c is now situated opposite another counter-cavity respectively referenced 664c, 664b and each cavity 664a-b is now situated opposite another counter-cavity respectively referenced 614b, 614c.

FIG. 9 shows the kit 600 at the end of the rotations of the barrels 606 and 656 and before the return into the closed position.

The empty cavity 614a and the empty counter-cavity 614b are situated opposite respectively an empty counter-cavity referenced 664c and an empty cavity referenced 664a. The cavity 614c carrying the first element 802 is situated opposite the counter-cavity 664b carrying the second element 804.

The kit 600 can then pass into the closed position (FIG. 7), where two new elements 802 and 804 are moulded and a new assembled part 806 is produced.

The method of moulding and assembling the part 806 from the first element 802 and the second element 804 implemented with the moulding machine comprising the kit 600 comprises, as from the closed position of the two support plates 604 and 654:

- a step of assembling a first previously moulded element 802 and second previously moulded element 804 by an assembly pair consisting of a cavity 614a and a counter-cavity 664a,
- a step of moulding the first element 802 by a moulding pair consisting of a cavity 614c and a counter-cavity 664c,
- a step of moulding the second element 804 by a moulding pair consisting of a cavity 664b and a counter-cavity 614b,
- a step of the two support plates 104 and 154 going into the open position,
- a step of ejecting the part 806 thus assembled,
- a step of rotating each barrel 606,656, so as to bring:
  - the cavity 614c carrying the first element 802 from a position opposite the counter-cavity 664c to a position opposite the counter-cavity 664b carrying the second element 804,
  - the cavity 664b carrying the second element 804 from a position opposite the counter-cavity 614b to a position opposite the counter-cavity 614c carrying the first element 802,
  - the cavity 614a that carried the first element 802 thus assembled from a position opposite the counter-cavity 664a that carried the second element 804 thus assembled to a position opposite the counter-cavity 664c, and
  - the cavity 664a that carried the second element 804 thus assembled from a position opposite the counter-cavity 614a that carried the first element 802 thus assembled to a position opposite the counter-cavity 614b,
- a step of the two support plates 604 and 654 going into the closed position, and
- a step of looping back onto the assembly step.

FIG. 11 shows a kit 1100 for an injection moulding machine according to another embodiment of the invention. The injection moulding machine makes it possible to mould two elements, to overmould at least one of the two and to assemble them in order to produce the part to be moulded.

The kit 1100 comprises a first assembly 1102 and a second assembly 1152.

The first assembly 1102 comprises a first support plate 1104 and the second assembly 1152 comprises a second support plate 1154.

The first support plate 1104 is intended to be fixed to the first platen, and the second support plate 1154 is intended to be fixed to the second platen, so that in the open position the two support plates 1104 and 1154 are distant from each other and in the closed position the two support plates 1104 and 1154 are up against each other.

For the first plate 1104, a barrel 1106 of a first type is fitted and for the second plate 1154 a barrel 1156 of a second type is fitted.

Each barrel 1106, 1156 is firstly mounted so as to be able to move in rotation on the support plate 1104, 1154 in question about an axis 1110, 1160 parallel to the translation direction 180 and secondly carries at least two cavities respectively referenced 1114a and 1114d, 1164a-c. For each of the cavities 1114a and 1114d, a counter-cavity 1164a, 1164d is disposed on the second support plate 1154, either on the barrel 1156 of the second type or directly on the second support plate 1154. For each of the cavities 1164a-c, a counter-cavity 1114a-c is disposed on the first support plate 1104, either on the barrel 1106 of the first type or directly on the first support plate 1104. The translation direction 180 is perpendicular to the plane of each support plate 1104, 1154.

In the embodiment in FIGS. 11 to 15b, the barrel 1106 of the first type carries two cavities 1114a and 1114d, and the barrel 1156 of the second type carries three cavities 1164a-c. The cavities 1164b and 1164c are seen in an offset cross section.

In order to assembly two previously moulded elements and, as explained below, at each rotation movement of each barrel 1106, 1156, one of the cavities 1114a of the barrel 1106 of the first type is opposite one of the counter-cavities 1164a of the barrel 1156 of the second type. This cavity 1114a of the barrel 1106 of the first type and this counter-cavity 1164a of the barrel 1156 of the second type constitute an assembly pair for the first moulded element and the second moulded and overmoulded element.

At each rotation movement of each barrel 1106, 1156, the other cavity 1114d of the barrel 1106 of the first type and the associated counter-cavity 1164d of the second support plate 1154 constitute a moulding pair for a first element of the part to be moulded.

One of the other cavities, here the cavity 1164b, of the barrel 1156 of the second type and the associated counter-cavity 1114b of the first support plate 1104 constitute a moulding pair for a second element of the part to be moulded.

One of the other cavities, here the cavity 1164c, of the barrel 1156 of the second type and the associated counter-cavity 1114c of the first support plate 1104 constitute a pair for overmoulding the second element.

The counter-cavities 1114b and 1114c and the counter-cavity 1164d are fixed to the support plates 1104 and 1154. The counter-cavities 1114b and 1114c are seen in an offset cross section.

FIG. 12 shows the kit 1100 in the closed position.

Each pair consisting of a counter-cavity 1114b-c and a cavity 1164b-c or the cavity 1114d and the counter-cavity 1164d, that is to say one of the moulding forms of which is not on a barrel 1106, 1156, constitutes a moulding pair or an overmoulding pair that is supplied by an injection press with material intended to produce the elements to be moulded or the overmoulding. The arrow 1202 represents this injection intended to mould the first element and the arrow 1204 represents this injection intended to mould the second element. The arrow 1208 represents this injection intended to carry out the overmoulding of the second element.

The arrow 1206 represents an assembly force that is generated for the assembly pair (1114a, 1164a) in order to effect the assembly of the first element and second element in order to produce the definitive part.

FIG. 13 shows the kit 1100 in the open position. This position follows the position shown in FIG. 12, where the first element 1302 has been moulded by the moulding pair (1114d, 1164d) for the first element, where a second element 1304 has been moulded by the moulding pair (1114b, 1164b) for the second element, and where a second element 1308 previously moulded by the moulding pair for the second element has been overmoulded by the overmoulding pair (1114c, 1164c).

In the open position, the part 1306 assembled from a first element 1302 and a second overmoulded element 1308 is ejected while the first element 1302 and the second moulded element 1304 and the second overmoulded element 1308 remain fixed to the corresponding barrel 1106, 1156.

FIG. 15a shows the first assembly 1102 seen in front view and FIG. 15b shows the second assembly 1152 seen in front view.

In the open position, the barrel 1106 of the first type is rotated by driving means over an angle of 180°, and the barrel 1156 of the second type is rotated by driving means over an angle of 120°. The arrows 1502a and 1502b represent these rotations.

After these rotations 1502a and 1502b, the kit 1100 goes into the closed position (FIG. 12) but the cavities 1114a and 1114d, and 1164a-c have moved. Each cavity 1114a, 1114d is now situated opposite another counter-cavity respectively referenced 1164d, 1164c, and each cavity 1164a-c is now situated opposite another counter-cavity respectively referenced 1114b, 1114c, 1114d.

FIG. 14 shows the kit 1100 at the end of the rotations of the barrels 1106 and 1156 and before the return to the closed position.

The empty cavity 1114a and the empty counter-cavity 1114b are situated opposite respectively an empty counter-cavity referenced 1164d and an empty cavity referenced 1164a. The cavity 1114d carrying the first element 1302 is situated opposite the counter-cavity 1164c carrying the second overmoulded element 1308. The cavity 1164b carrying the second moulded element 1304 is situated opposite the counter-cavity 1114c.

Naturally, if the first element 1302 is to be overmoulded before being assembled, it is possible to introduce another cavity on the barrel of the first type and an associated counter-cavity on the second support plate. The rotation of the barrel of the first type is then 120° at each rotation.

The kit 1100 can then go into the closed position (FIG. 12), in which two new elements 1302 and 1304 are moulded, in which a new second element 1308 is overmoulded and in which a new assembled part 1306 is produced.

The method of moulding, overmoulding and assembling the part 1306 from the first element 1302 and the second overmoulded element 1304 implemented with the moulding machine comprising the kit 1100 comprises, from the closed position of the two support plates 1104 and 1154:

- a step of assembling a first element 1302 previously moulded and a second element 1304 previously moulded and overmoulded by means of an assembly pair consisting of a cavity 1114a and a counter-cavity 1164a,
- a step of overmoulding a second previously moulded element 1308 by means of an overmoulding pair consisting of a cavity 1114c and a counter-cavity 1164c,
- a step of moulding the first element 1302 by a moulding pair consisting of a cavity 1114d and a counter-cavity 1164d,
- a step of moulding the second element 1304 by a moulding pair consisting of a cavity 1164b and a counter-cavity 1114b,
- a step of the two support plates 1104 and 1154 going into the open position,
- a step of ejecting the part 1306 thus assembled,
- a step of rotating each barrel 1106, 1156, so as to bring:
  - the cavity 1164b carrying the second previously moulded element 1304 from a position opposite the counter-cavity 1114b to a position opposite the counter-cavity 1114c,
  - the cavity 1114d carrying the first element 1302 from a position opposite the counter-cavity 1164d to a position opposite the counter-cavity 1164c carrying the second element 1308 thus overmoulded,
  - the cavity 1164c carrying the second element 1308 thus overmoulded from a position opposite the counter-cavity 1114c to a position opposite the counter-cavity 1114d carrying the first element 1302,
  - the cavity 1114a that carried the first element 1302 thus assembled from a position opposite the counter-cavity 1164a that carried the second element 1308 thus assembled to a position opposite the counter-cavity 1164d,
  - the cavity 1164a that carried the second element 1308 thus assembled from a position opposite the counter-cavity 1114a that carried the first element 1302 thus assembled to a position opposite the counter-cavity 1114b,
- a step of the two support plates 1104 and 1154 passing into a closed position, and
- a step of looping back onto the assembly step.

Naturally the present invention is not limited to the examples and embodiments described and depicted but is capable of numerous variants accessible to persons skilled in the art.

For example, the directions of rotation of the various barrels may be different.

In each of the embodiments described above, the number of cavities and the number of counter-cavities, as well as the angular distributions thereof, may vary.

The invention claimed is:

1. Kit for a machine for the injection moulding of moulded parts, the moulding machine comprising a first platen and a second platen, the kit comprising:

a first support plate intended to be fixed to the said first platen, a second support plate intended to be fixed to the said second platen, the two platens being designed to be able to move with respect to each other by sliding in a translation direction so as to adopt successively an open position in which the two support plates are distant from each other and a closed position in which the two support plates are up against each other, for the first support plate, at least one first barrel, mounted so as to able to move in rotation on the said first support plate about an axis perpendicular to the plane of the said first support plate, and carrying at least two cavities, for the second support plate, at least one second barrel, mounted so as to be able to move in rotation on said second support plate about an axis perpendicular to the plane of the said second support plate, and carrying at least three counter-cavities, driving means intended to rotate each barrel to allow the successive positioning of each cavity, opposite at least two different counter-cavities and so that, at each rotation movement of each barrel, one of the cavities of said first barrel is opposite one of counter-cavities of the said second barrel and so that, at each rotation movement of each barrel, the other cavity of said first barrel and the associated counter-cavity of said second support plate constitute a moulding pair for a first element of the part to be moulded, one of the other cavities of said second barrel and the associated counter-cavity of said first support plate constitute a moulding pair for a second element of the part to be moulded, one of the other cavities of said second barrel and the associated counter-cavity of said first support plate constitute an overmoulding pair for said second element, and said pair consisting of the cavity of said first barrel and counter-cavity of said second barrel constitute an assembly pair for said first element thus moulded and for said second element thus moulded and overmoulded.

2. Machine for the injection moulding of moulded parts, comprising:
 a first platen,
 a second platen, the two platens being designed to be able to move with respect to each other by sliding in a translation direction, and
 a kit according to claim 1.

* * * * *